April 11, 1967 J. G. DILL 3,313,959

THIN-FILM RESONANCE DEVICE

Original Filed Dec. 10, 1963 2 Sheets-Sheet 1

INVENTOR.
JOHANN G. DILL,
BY
Paul M. Coble
ATTORNEY.

THIN-FILM RESONANCE DEVICE

Original Filed Dec. 10, 1963 2 Sheets-Sheet 2

INVENTOR.
JOHANN G. DILL,
BY
Paul M. Coble
ATTORNEY.

United States Patent Office 3,313,959
Patented Apr. 11, 1967

3,313,959

THIN-FILM RESONANCE DEVICE

Johann G. Dill, Costa Mesa, Calif., assignor to Hughes Aircraft Company, Culver City, Calif., a corporation of Delaware Continuation of application Ser. No. 329,406, Dec. 10, 1963. This application Aug. 8, 1966, Ser. No. 571,137
9 Claims. (Cl. 307—88.5)

This application is a continuation of application Ser. No. 329,406, filed Dec. 10, 1963, now abandoned.

This invention relates to thin-film electrical devices, and more particularly relates to a resonance device consisting solely of thin-film components.

The extensive application of resonant circuits in band-pass amplifiers, oscillators, mixers, and other electronic signal processing networks has resulted in a continuing search for new and improved resonance devices. With the recent interest in micro-miniaturized circuitry, there has been a need for developing a resonant circuit small enough to be compatible with the remainder of the circuit which has been miniaturized. The problem has been primarily acute on account of the difficulty in achieving practical inductive reactances by means other than large and cumbersome coils which are wholly incompatible with micro-miniaturized circuitry.

A recent innovation which has enabled significant advances to be achieved in solid state micro-circuitry has been the development of the thin-film transistor. This type of transistor operates by the control of injected majority charge carriers in a wide bandgap semi-conductor or semi-insulator material by means of an insulated control gate electrode. These devices are analogous to triode vacuum tubes; however, thin-film transistors are solid state devices, and all components including the semi-insulator as well as the necessary electrodes are usually deposited by evaporation upon a substrate. In triode vacuum tubes electrons emitted from the cathode flow through the vacuum to the anode, and the density of these electrons may be controlled by a grid electrode interposed between the cathode and plate electrodes. In thin-film transistor devices, majority charge carriers are injected into the solid state semi-insulator material by an electrode usually termed the "source," and these majority carriers move through the semi-insulator toward a second electrode called the "drain." The control electrode, which by its field effect in the semi-insulator can vary the density of majority charge carriers reaching the drain, is termed the "gate" and is usually insulated from the semi-insulator material to prevent majority carriers from flowing to it. In comparison with semi-conductor devices of the junction type in which charge carriers already available in the semi-conductor body are injected across a junction between regions of opposite conductivity type, charge carriers in thin-film transistors are normally not available in the body of semi-insulator material and are injected thereinto from an electrode having a lower work function than the work function of the semi-insulator. For a more complete discussion of thin-film transistor devices, reference may be made to an article by P. K. Weimer entitled, "The TFT—A New Thin-Film Transistor," published in the June 1962 Proceedings of the I.R.E., on pages 1462–1469. In view of the ready integration of thin-film transistor devices with passive thin-film components, it would be highly desirable if a resonant circuit, including the necessary inductive reactance, could be developed out of thin-film components.

Accordingly, it is an object of the present invention to provide a resonance circuit consisting solely of thin-film components.

It is a further object of the present invention to provide an electrical resonance device which is substantially smaller and lighter than has been achievable in the prior art.

It is a still further object of the present invention to provide a resonance circuit in which all of the circuit components may be integrated onto a single substrate of insulating material, thereby lending itself to the micro-miniaturization of electrical circuits.

It is yet another object of the present invention to provide a thin-film resonance device which is relatively insensitive to temperature and in which the resonant frequency and the Q of the device can be varied over a substantial range.

In accordance with the foregoing objects, the resonance device of the present invention includes a thin-film transistor having a source electrode, a drain electrode, and first and second gate electrodes. A first capacitance is coupled between the first gate electrode and the source electrode, while a second capacitance is coupled between the second gate electrode and the drain electrode. A first resistance is coupled between the second gate electrode and the source electrode, and a second resistance is coupled between the first gate electrode and the drain electrode. The resonance device may be formed in integrated circuit arrangement, with the thin-film transistor electrodes also providing the necessary capacitance and with resistive strips which intercouple the electrodes furnishing the required resistance. In a modified integrated circuit arrangement a longer channel length of active thin-film material is provided so as to achieve a higher Q for the resonance.

Other and further objects, advantages, and characteristic features of the present invention will become readily apparent from consideration of the following detailed description of preferred embodiments of the invention when taken in conjunction with the accompanying drawings in which.

Figure 1:
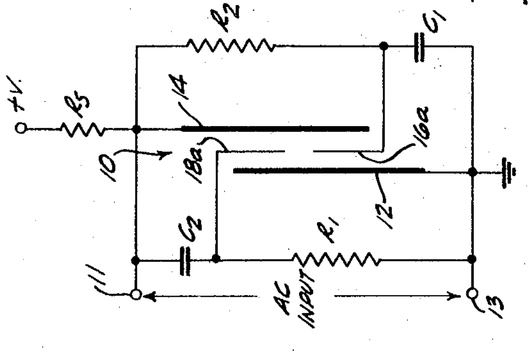
FIG. 1 is a schematic circuit diagram of a resonance device provided according to the principles of the present invention and including a biasing arrangement.
Figure 8:
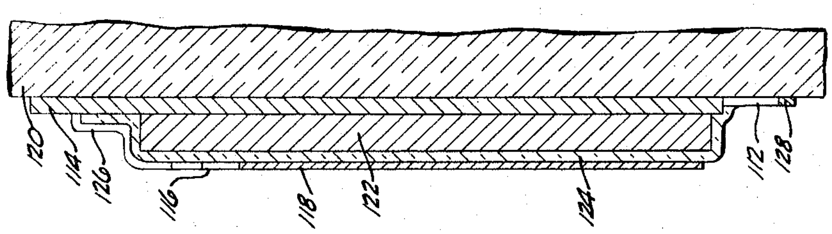
FIG. 8 is a cross-sectional view taken along line 8—8 of FIG. 5.
Figure 7:
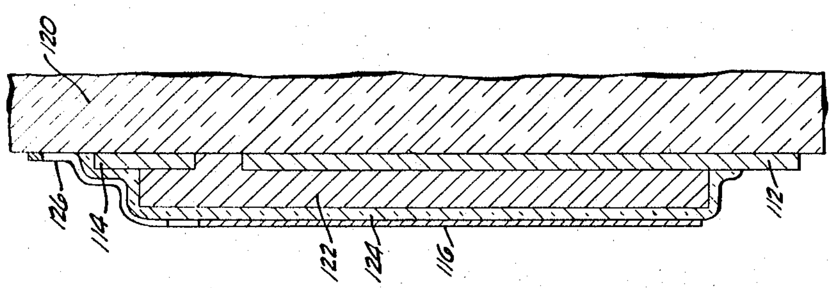
FIG. 7 is a cross-sectional view taken along line 7—7 of FIG. 5.
Figure 5:
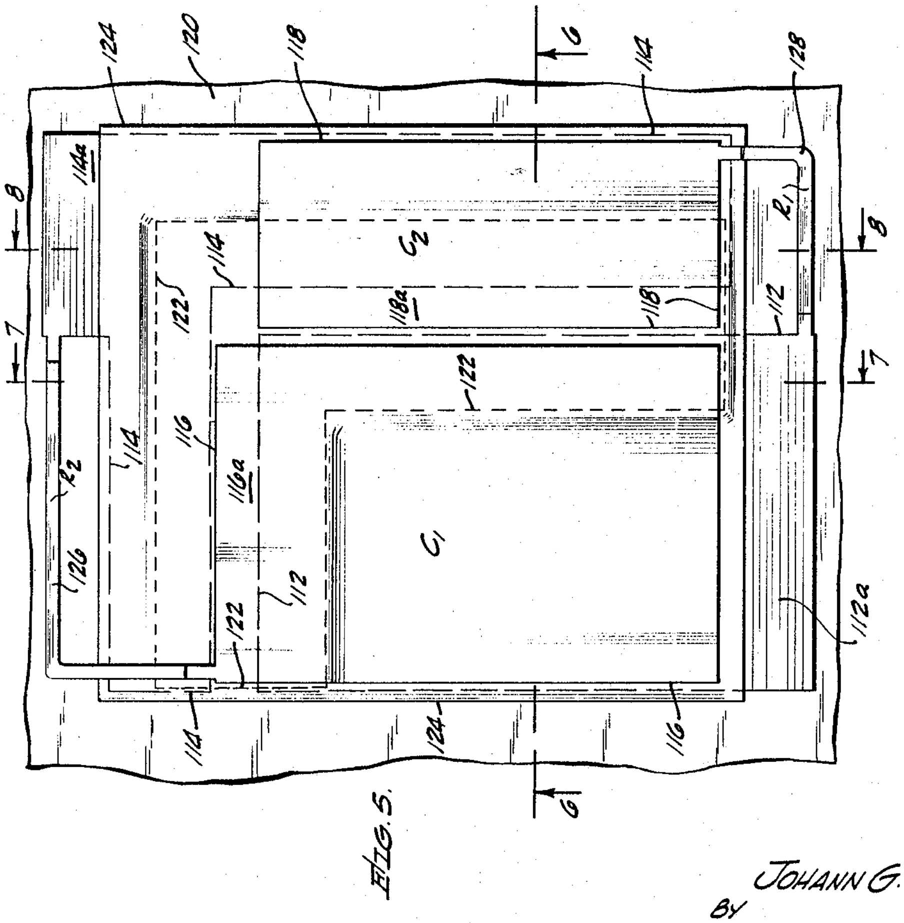
FIG. 5 is a plan view of an integrated circuit arrangement of the device of FIG. 1 provided according to a further embodiment of the present invention.
Figure 6:
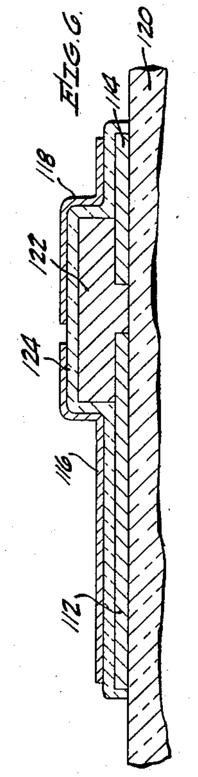
FIG. 6 is a cross-sectional view taken along line 6—6 of FIG. 5.

Referring to FIG. 1 with more particularity, a thin-film resonance device according to the present invention may be seen to include a thin-film amplifying device 10 such as a thin-film transistor having a source electrode 12, a drain electrode 14 and a pair of gate electrodes 16*a* and 18*a*. The first gate electrode 16*a* is coupled to the source electrode 12 through a capacitance $C_1$ while a resistance $R_1$ intercouples the source electrode 12 with the second gate electrode 18*a*. A second capacitance $C_2$ is coupled between the second gate electrode 18*a* and the drain electrode 14, while the drain electrode 14 is coupled to the first gate electrode 16*a* via a second resistance $R_2$. An alternating current input signal of frequency $\omega$ which may be furnished from an A.C. signal generator or oscillator, for example, may be applied between a pair of input terminals 11 and 13 respectively connected to the drain electrode 14 and the source electrode 12.

As shown in FIG. 1, the circuit may be biased by connecting the source electrode 12 to a level of reference potential such as ground and applying a positive potential such as +V to the drain electrode 14 through a bias source resistance $R_s$. The source resistance $R_s$ is made relatively large to provide a substantially constant current bias to the thin-film transistor 10 in order to preclude short circuiting of the alternating current output from the circuit. Alternatively, the circuit may be biased by connecting the drain electrode 14 directly to the +V terminal and interposing another thin-film amplifying stage between the source electrode 12 and the ground level.

Figure 4:
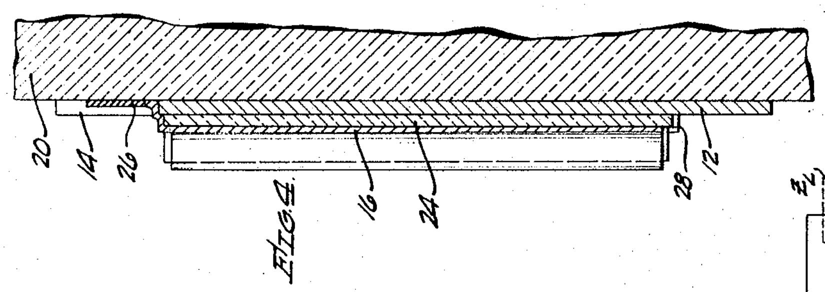
FIG. 4 is a cross-sectional view taken along line 4—4 of FIG. 2.
Figure 2:
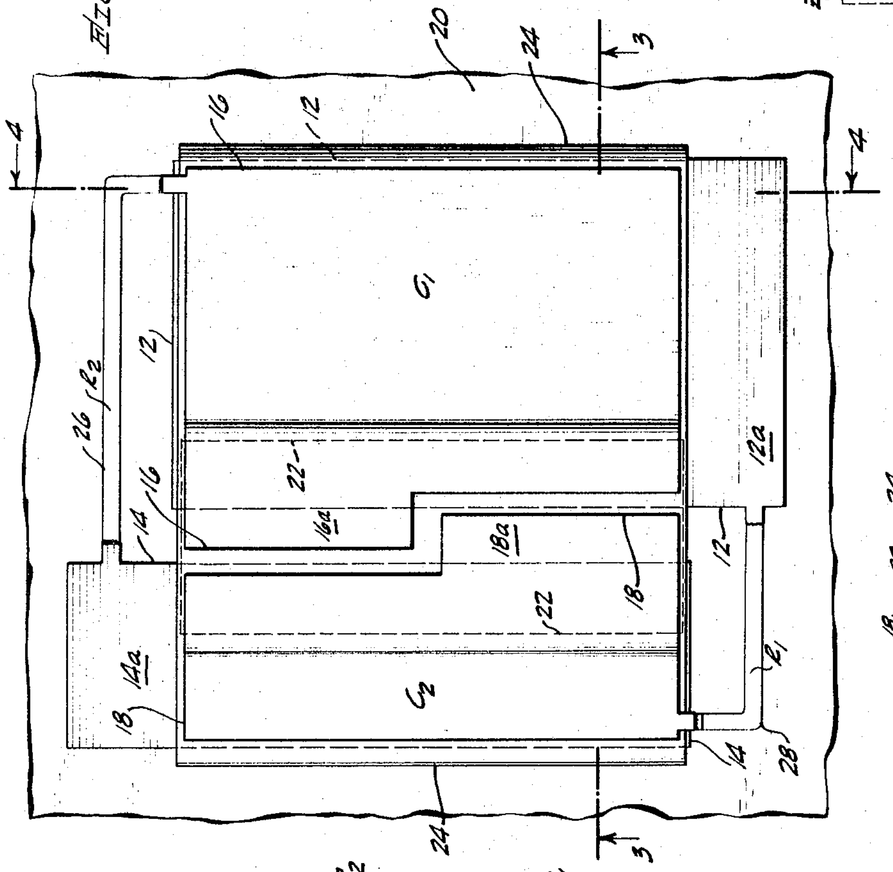
FIG. 2 is a plan view of an integrated circuit arrangement of the device of FIG. 1 provided according to one embodiment of the present invention.
Figure 3:
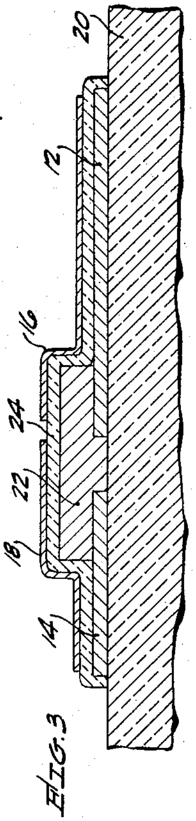
FIG. 3 is a cross-sectional view taken along line 3—3 of FIG. 2.

An arrangement in integrated circuit form for the resonance device of FIG. 1 according to one embodiment of the invention is illustrated in FIGS. 2–4. By integrated circuit form it is meant that all of the circuit components are incorporated onto a single base, or substrate, 20 of insulating material. First and second electrically conductive films 12 and 14, respectively serving as a source electrode and a drain electrode, are deposited on the surface of the substrate 20. The electrodes 12 and 14 are located a predetermined distance apart and extend parallel to one another along the substrate 20, with the extent of the electrodes 12 and 14, in regions where covered by other material, being shown in long dashed line in FIG. 2. A layer 22 of semi-insulator material is formed on the substrate 20 in the region between the electrodes 12 and 14. The layer 22 has a thickness greater than that of the electrodes 12 and 14, and outer upper regions of the layer 22 overlap portions of the electrodes 12 and 14. The extent of the layer 22 is indicated in short dashed line in FIG. 2.

As used herein the term "semi-insulator" material means a material which has substantially no intrinsic charge carriers therein for the conductance of current but which is capable of having charge carriers injected thereinto from a material having a lower work function than that of the semi-insulator. A preferable semi-insulator material for the layer 22 is cadmium sulfide; however, other suitable semi-insulator materials are compounds formed by elements of the second and sixth columns of the Mendeleev Periodic Table of Elements, as well as compounds formed by the elements of the third and fifth columns of this Periodic Table. Some of the more preferable semi-insulator materials in addition to cadmium sulfide are: cadmium telluride, cadmium selenide, zinc sulfide, zinc selenide, zinc telluride, gallium arsenide, gallium phosphide, indium arsenide, indium phosphide, and indium antimonide. These materials are preferred primarily because of their more advantageous physical properties among which are thermal stability and ability to be vapor-deposited and plated with metal.

The source electrode 12 and the drain electrode 14 should be of a metal capable of making ohmic contact with the semi-insulator layer 22. Satisfactory electrode materials which may be employed are aluminum, silver, indium, tellurium, and cadmium. The electrodes 12 and 14 and the semi-insulator layer 22 may be formed by vapor deposition and masking techniques well known in the art, such as those described in the aforementioned Weimer article and the references thereof.

A layer 24 of insulating material, for example silicon monoxide, is formed on top of the semi-insulator 22 and extends above most of the upper surfaces of the source and the drain electrodes 12 and 14. However, a portion 12*a* of the source electrode and a portion 14*a* of the drain electrode extend beyond the insulating film 24 at opposite ends thereof. A metal film 16 is formed on top of the insulating film 24 substantially over the source electrode 12. The film 16 defines a portion 16*a* projecting beyond the edge of the source electrode 12 and over the semi-insulator material 22 located between the source electrode 12 and the drain electrode 14 to provide a first gate electrode. A metal film 18, which is formed on top of the insulating film 24 substantially over the drain electrode 14, has a portion 18*a* which projects beyond the edge of the drain electrode 14 and over a portion of the semi-insulator film 22 between the source electrode 12 and the drain electrode 14 in a manner complementary to the projecting portion 16*a* of the film 16 to provide a second gate electrode. The gate electrodes 16*a* and 18*a*, which may be of gold for example, are capable of providing independent control of the flow of majority charge carriers in the semi-insulator 22 flowing from the source electrode 12 to the drain electrode 14, and along with the insulating layer 24 may be formed by well known vapor deposition and masking techniques.

A strip 26 of resistive material, such as a vapor deposited nickel-chromium film, is formed on top of the substrate 20 and is connected to the projecting portion 14*a* of the drain electrode 14 and to the gate electrode film 16. A similar resistive strip 28 is formed on the substrate 20 between the extending portion 12*a* of the source electrode 12 and the gate electrode film 18. The strips 26 and 28 serve as respective resistances $R_2$ and $R_1$ in the circuit of FIG. 1, with the strip 26 being made longer than the strip 28 so that $R_2>R_1$. The gate electrode film 16 and the source electrode 12 also function as respective plates of the first capacitance $C_1$, with the insulating film 24 serving as the dielectric separating these plates. Similarly, the gate electrode film 18 and the drain electrode 14 function as respective plates of the second capacitance $C_2$. The opposing areas of the films 12 and 16 are made larger than the opposing areas of films 14 and 18 so that $C_1>C_2$. Thus, it will be appreciated that the conductive films 12 and 16 not only serve as respective drain and gating elements of a thin-film amplifying device, but they also provide a capacitance; and similarly, the conductive films 14 and 18 furnish a capacitance in addition to serving as the respective source and gating elements of the thin-film amplifying device.

An integrated circuit arrangement of the resonance device of FIG. 1 provided according to a further embodiment of the present invention is illustrated in FIGS. 5–8. Since this embodiment comprises the same elements as the embodiment of FIGS. 2–4, corresponding elements in the embodiment of FIGS. 5–8 are designated by the same reference numerals as their counterpart components in the embodiment of FIGS. 2–4 except prefixed by the numeral "1." The constituent materials and the functions of the respective elements in the embodiment of FIGS. 5–8 are the same as set forth above for the respective corresponding elements of the embodiment of FIGS. 2–4. However, the geometry of certain of the thin-film components in the embodiment of FIGS. 5–8 is slightly different from that of corresponding components of the embodiment of FIGS. 2–4 in order to provide a longer active channel length for the semi-insulator material. This produces a higher transconductance $g_m$ for the thin-film transistor, resulting in a higher circuit Q.

The longer active channel length is realized by making both the semi-insulator layer 122 (shown in short dashed lines in FIG. 5) and the drain electrode 114 (shown in long dashed lines in regions where covered in FIG. 5) substantially L-shaped. The gate electrode film 116 defines a portion 116*a* which projects beyond the edge of the source electrode 112 and over a portion of one leg of the L of the semi-insulator layer 122, while the gate electrode film 118 defines a portion 118*a* which projects beyond the edge of drain electrode 114 and over a portion of the other leg of the L of the semi-insulator layer 122.

The operation of the device of the present invention to provide a resonant circuit may be better understood from consideration of the following simplified mathematical analysis relating to the behavior of the circuit of FIG. 1. The simplification results from an assumption that the thin-film transistor device 10 has an infinite input impedance which includes negligible feedback capacitance from the drain electrode to the gate electrodes, and from a further assumption that the device has ideal pentode-like drain current-voltage ($i_d - v_d$) characteristics. Moreover, current flow through the branch consisting of resistance $R_1$ and capacitance $C_2$ and through the branch comprising resistance $R_2$ and capacitance $C_1$ is assumed to be negligible compared to the drain current $i_d$ which flows through the thin-film device 10.

First, examining the behavior of the branch consisting of resistance $R_1$ and capacitance $C_2$ as a voltage divider, it may be seen that the ratio of the voltage $v_g$ appearing at the gate electrode **18*a* with respect to ground to the voltage $v_d$ at the drain electrode 14 with respect to ground, i.e. the A.C. input voltage appearing between the terminals 11 and 13**, is given by:

$$\frac{v_g}{v_d}=\frac{R_1}{R_1+\frac{1}{j\omega C_2}}=\frac{j\omega R_1C_2}{j\omega R_1C_2+1} \quad (1)$$

In view of the negligible current flow through voltage dividers, the current at the input terminals 11 and 13 is assumed equal to the drain current $i_d$, and thus the input impedance of the circuit of FIG. 1 measured between the terminals 11 and 13 is given by:

$$Z=\frac{v_d}{i_d} \quad (2)$$

Since the transconductance $g_m$ of the thin-film transistor 10 is defined as the ratio of drain current to gate voltage, the drain current $i_d$ is:

$$i_d=g_m v_g \quad (3)$$

Solving Equation 1 for $v_d$ and substituting the result in Equation 2, and also substituting Equation 3 in Equation 2 gives:

$$Z=\frac{j\omega R_1C_2+1}{j\omega R_1C_2g_m}=\frac{1}{g_m}-\frac{j}{g_m\omega R_1C_2} \quad (4)$$

From Equation 4 may be seen that an impedance $Z_c$ results (see FIG. 9) which behaves like a resistance $R_c$ and a capacitance C in series, the values of $R_c$ and C being given by Equations 5 and 6, respectively:

$$R_c=\frac{1}{g_m} \quad (5)$$

$$C=R_1C_2g_m \quad (6)$$

The Q of the capacitive impedance network $Z_c$ expressed by Equation 4 is given by:

$$Q_c=\frac{1}{\omega R_cC}=\frac{1}{\omega R_1C_2} \quad (7)$$

Examining the behavior of the voltage dividing network consisting of resistance $R_2$ and capacitance $C_1$ reveals that the ratio of the voltage $v_g$ at the gate electrode **16*a* to the voltage $v_d$ at the drain electrode 14** is:

$$\frac{v_g}{v_d}=\frac{\frac{1}{j\omega C_1}}{\frac{1}{j\omega C_1}+R_2}=\frac{1}{1+j\omega R_2C_1} \quad (8)$$

Solving Equation 8 for $v_d$ and substituting the result, along with Equation 3, into Equation 2 yields:

$$Z=\frac{1+j\omega R_2C_1}{g_m}=\frac{1}{g_m}+\frac{j\omega R_2C_1}{g_m} \quad (9)$$

Thus, an impedance $Z_L$ is provided (see FIG. 9) which behaves like an inductance L and a resistance $R_L$ in series, with respective values for $R_L$ and L being given by Equations 10 and 11:

$$R_L=\frac{1}{g_m} \quad (10)$$

$$L=\frac{R_2C_1}{g_m} \quad (11)$$

The Q of the inductive impedance $Z_L$ is given by:

$$Q_L=\frac{\omega L}{R}=\omega R_2C_1 \quad (12)$$

Figure 9:
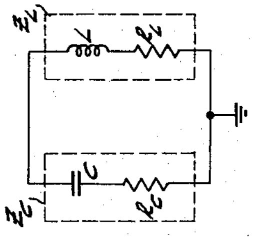
FIG. 9 illustrates a simplified equivalent circuit for the resonance device of FIG. 1 which is used in explaining the theory of the present invention.

The resistances $R_c$ and $R_L$ in the simplified equivalent circuit of FIG. 9 which approximates the behavior of the circuit of FIG. 1 are small compared to the reactances provided by the capacitance C and the inductance L, and as a first approximation may be neglected. Therefore, the circuit of FIG. 9 may be seen to support parallel resonance at a resonant frequency $\omega_0$ given by the relation:

$$\omega_0^2\approx\frac{1}{LC}=\frac{1}{R_1R_2C_1C_2} \quad (13)$$

The overall Q for the circuit of FIG. 9 is given by:

$$Q=\frac{Q_CQ_L}{Q_C+Q_L} \quad (14)$$

where $Q_C$ and $Q_L$ are the respective Q's for the capacitive and inductive branches as given by Equations 7 and 12, respectively.

An example of typical values for the circuit elements of FIG. 1 is as follows:

$R_2$=1K.
$R_2$=10K.
$C_1$=200 pf.
$C_2$=20 pf.
$f=\omega/2\pi$=1 mc.
$g_m$=.001 mho.

Using the above element values in Equations 11, 6, 12, 7, 14 and 13 results in the following values for respective parameters of the equivalent circuit of FIG. 9:

$L$=2 mh.
$C$=20 pf.
$Q_L$=12.3
$Q_C$=7.9
$Q$=4.95
$\omega_0=5\times10^6$ rad./sec.

It should be pointed out that the resonant frequency $\omega_0$ for the resonance device of FIG. 1 may be varied by varying one or more of the elements $R_1$, $R_2$, $C_1$, and $C_2$. One way in which electronic variation of the resonant frequency $\omega_0$ may be achieved is to substitute a semiconductor layer, of germanium or silicon for example, for portions of the insulating film 24 and applying a variable voltage to the semiconductor film so that the capacitance $C_1$ or $C_2$, or both, may be altered in varactor-type fashion. From Equations 7 and 12 it will be apparent that as one or more of the elements $R_1$, $R_2$, $C_1$, and $C_2$ is varied, the Q of the resonance is also varied.

It is further pointed out that in view of the assumptions set forth above the foregoing analysis is only approximate, and in actual practice the resonant frequency $\omega_0$ and the Q of the circuit are to some degree dependent upon the transconductance $g_m$ of the thin-film transistor 10. Therefore, both the resonant frequency $\omega_0$ and the Q of the resonance may be changed by either varying the transconductance $g_m$ directly or by altering the bias voltage +V to indirectly vary $g_m$.

Although the present invention has been shown and described with reference to particular embodiments, nevertheless various changes and modifications obvious to one skilled in the art to which the invention pertains is deemed to be within the purview of the invention as set forth in the appended claims.

What is claimed is:

1. A resonance circuit comprising a body of semi-insulator material, first and second electrodes separated by and making ohmic contact with said semi-insulator body, third and fourth electrodes capacitively coupled with said body for controlling the flow of injected majority charge carriers in said semi-insulator body between said first and second electrodes, a first voltage dividing network including a resistive device and a reactive device coupled in series between said first and second electrodes with the junction between the said devices coupled to said third electrode, a second voltage dividing network including a reactive device and a resistive device coupled in series between said first and second electrodes with the junction between the said devices coupled to said fourth electrode.

2. A resonance circuit comprising first and second terminals, a body of semi-insulator material, first and second electrodes in ohmic contact with said semi-insulator body and respectively connected to said first and second terminals, a resistive device having one terminal coupled to said first terminal, first means for controlling the flow of injected majority charge carriers in said semi-insulator body between said first and second electrodes and for providing a capacitance between the other terminal of said first resistive device and said second terminal, a second resistive device having one terminal coupled to said second terminal, second means for controlling the flow of injected majority charge carriers in said semi-insulator body and for providing a capacitance between the other terminal of said second resistive device and said first terminal.

3. A resonance circuit comprising a body of semi-insulator material, first and second spaced electrodes in ohmic contact with said semi-insulator body, third and fourth electrodes capacitively coupled with said body for controlling the flow of injected majority charge carriers in said semi-insulator body between said first and second electrodes, a first capacitive device coupled between said first and third electrodes, a second capacitive device coupled between said second and fourth electrodes, a first resistive device coupled between said first and fourth electrodes, and a second resistive device coupled between said second and third electrodes.

4. A resonance circuit comprising a thin-film transistor having a source electrode, a drain electrode, and first and second gate electrodes; a first capacitive device coupled between said first gate electrode and said source electrode; a second capacitive device coupled between said second gate electrode and said drain electrode; a first resistive device coupled between said second gate electrode and said source electrode; and a second resistive device coupled between said first gate electrode and said drain electrode.

5. A resonance circuit according to claim 4 wherein the resistance of said second resistive device is larger than the resistance of said first resistive device and the capacitance of said first capacitive device is larger than the capacitance of said second capacitive device.

6. A thin-film resonance device comprising first and second films of electrically conductive material disposed on spaced regions of a surface of insulator material, a film of semi-insulator material disposed on said insulator surface between said first and second electrically conductive films, said semi-insulator film having a thickness greater than the thickness of said electrically conductive films and having portions which overlap and make ohmic contact with a portion of each of said first and second electrically conductive films, a layer of insulator material extending over at least substantial portions of said semi-insulator film and said first and second electrically conductive films, a third film of electrically conductive material disposed on said layer of insulator material and extending over a substantial portion of said first electrically conductive film, said third electrically conductive film having a portion which projects beyond the edge of said first electrically conductive film in the direction of said second electrically conductive film, a fourth film of electrically conductive material disposed on said layer of insulator material and extending over a substantial portion of said second electrically conductive film, said fourth electrically conductive film having a portion which projects beyond the edge of said second electrically conductive film in the direction of said first electrically conductive film, first resistive means electrically interconnecting said first and fourth electrically conductive films, and second resistive means electrically interconnecting said second and third electrically conductive films.

7. A thin-film resonance device comprising a thin-film transistor which includes: a source electrode and a drain electrode disposed on spaced regions of a surface of insulator material, a film of semi-insulator material disposed on said insulator surface between said source and drain electrodes, said semi-insulator film having a thickness greater than the thickness of said source and drain electrodes and having portions which overlap a portion of each of said source and drain electrodes, a layer of insulator material extending over at least substantial portions of said semi-insulator film and said source and drain electrodes, a first layer of electrically conductive material disposed on said layer of insulator material and having a substantial surface parallel to said source electrode to provide in conjunction therewith a first capacitance, said first electrically conductive layer having a portion which extends over a first portion of the semi-insulator material located between said source and drain electrodes to provide a first gate electrode, a second layer of electrically conductive material disposed on said layer of insulator material and having a substantial surface parallel to said drain electrode to provide in conjunction therewith a second capacitance, said second electrically conductive layer having a portion which extends over a second portion of the semi-insulator material located between said source and drain electrodes to provide a second gate electrode; first resistive means electrically inter-connecting said source electrode with said first electrically conductive layer; and second resistive means electrically interconnecting said drain electrode with said second electrically conductive layer.

8. A thin-film resonance device comprising an insulating substrate, first and second films of electrically conductive material disposed on said substrate a predetermined distance apart and extending substantially parallel to one another in a given direction along said substrate, a film of semi-insulator material disposed on said substrate between said first and second electrically conductive films, said semi-insulator film having a thickness greater than the thickness of said electrically conductive films and having portions which overlap and make ohmic contact with a portion of each of said first and second electrically conductive films, a layer of insulator material substantially covering said semi-insulator film and said first and second electrically conductive films, said first electrically conductive film defining a projecting portion which extends beyond said semi-insulator film and said insulator layer at one end of said semi-insulator film, said second electrically conductive film defining a projecting portion which extends beyond said semi-insulator film and said insulator layer at the other end of said semi-insulator film, a third film of electrically conductive material disposed on said layer of insulator material and substantially extending over said first electrically conductive film except for its projecting portion, said third electrically conductive film defining a portion which projects beyond the edge of said first electrically conductive film in a direction perpendicular to said given direction and over a portion of said semi-insulator film located between said first and second electrically conductive films and extending from substantially said other end of said semi-insulator film, a fourth film of electrically conductive material disposed on said layer of insulator material and substantially extending over said second electrically conductive film except for its projecting portion, said fourth electrically conductive film defining a portion which projects beyond the edge of said second electrically conductive film in a direction perpendicular to said given direction and over a portion of said semi-insulator film located between said first and second electrically conductive films and extending from substantially said one end of said semi-insulator film, a first resistive strip disposed on said insulating substrate and electrically interconnecting said projecting portion of said first electrically conductive film with said fourth electrically conductive film, and a second resistive strip disposed on said insulating substrate and electrically interconnecting said projecting portion of said second electrically conductive film with said third electrically conductive film.

9. A thin-film resonance device comprising an insulating substrate, a first film of electrically conductive material of substantially rectangular shape disposed on said substrate, a second film of electrically conductive material of substantially L-shape disposed on said substrate and having first and second portion extending substantially parallel to respective first and second edges of said first film so that a substantially L-shaped region exists on said substrate between said first film and said second film, a substantially L-shaped film of semi-insulator material disposed on said substrate between said first and second electrically conductive films, said semi-insulator film having a thickness greater than the thickness of said electrically conductive films and having portions which overlap and make ohmic contact with a portion of each of said electrically conductive films, a layer of insulator material substantially covering said semi-insulator film and said electrically conductive films, said first electrically conductive film defining a projecting portion opposite said second edge which extends beyond said semi-insulator film and said insulator layer in a direction parallel to said first edge, said second electrically conductive film defining a projecting portion which extends beyond said second portion and said insulator layer in a direction opposite to the direction in which the projecting portion of said first electrically conductive film extends, a third film of electrically conductive material disposed on said layer of insulator material and substantially extending over said first electrically conductive film except for its projecting portion, said third electrically conductive film defining a portion which projects beyond said second edge of said first electrically conductive film and over a portion of the L-shaped semi-insulator film thereadjacent, a fourth film of electrically conductive material disposed on said layer of insulator material and substantially extending over said first portion of said second electrically conductive film, said fourth electrically conductive film defining a portion which projects beyond the edge of said first portion in a direction perpendicular to said first edge and over a portion of the L-shaped semi-insulator film thereadjacent, a first resistive strip disposed on said insulating substrate and electrically interconnecting said projecting portion of said first electrically conductive film with said fourth electrically conductive film, and a second resistive strip disposed on said insulating substrate and on said insulating layer and electrically interconnecting said projecting portion of said second electrically conductive film with said third electrically conductive film.

References Cited by the Examiner

UNITED STATES PATENTS

| | | | |
|---|---|---|---|
| 3,110,870 | 11/1963 | Ziffer | 331—113 |
| 3,134,912 | 5/1964 | Evans | 307—88.5 |
| 3,191,061 | 6/1965 | Weimer | 307—88.5 |
| 3,258,663 | 6/1966 | Weimer | 317—235 |

JOHN W. HUCKERT, *Primary Examiner.*

J. D. KALLAM, *Assistant Examiner.*